J. JESSEN.
BAG CLOSING AND TYING MACHINE.
APPLICATION FILED APR. 13, 1915.

1,196,459.

Patented Aug. 29, 1916.
13 SHEETS—SHEET 1.

WITNESSES
P. H. Knapp
H. A. Bowman

INVENTOR
JAMES JESSEN
BY P. A. Whiteley ATTORNEY

J. JESSEN.
BAG CLOSING AND TYING MACHINE.
APPLICATION FILED APR. 13, 1915.

1,196,459.

Patented Aug. 29, 1916.
13 SHEETS—SHEET 2.

WITNESSES

INVENTOR
JAMES JESSEN
BY ATTORNEY

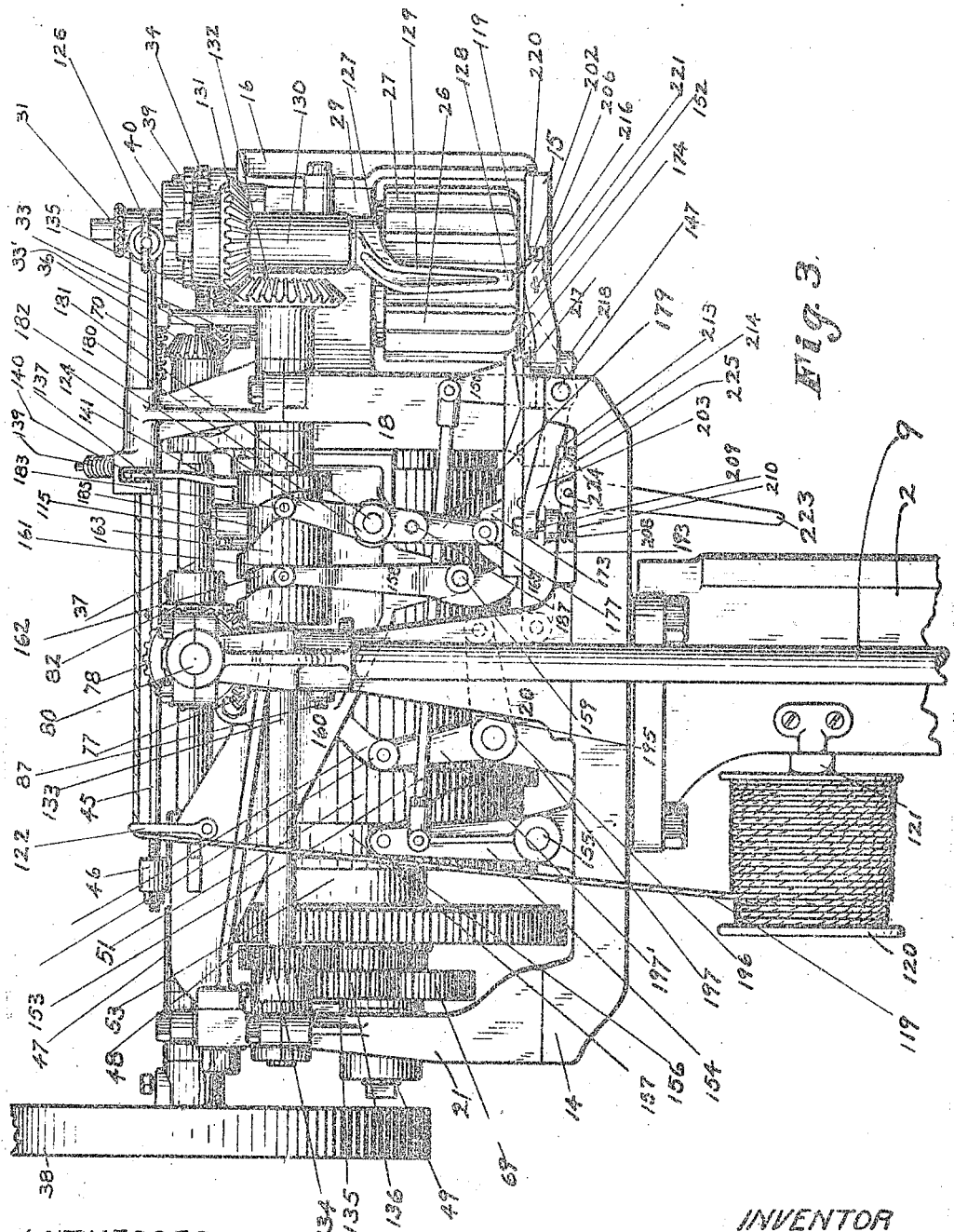

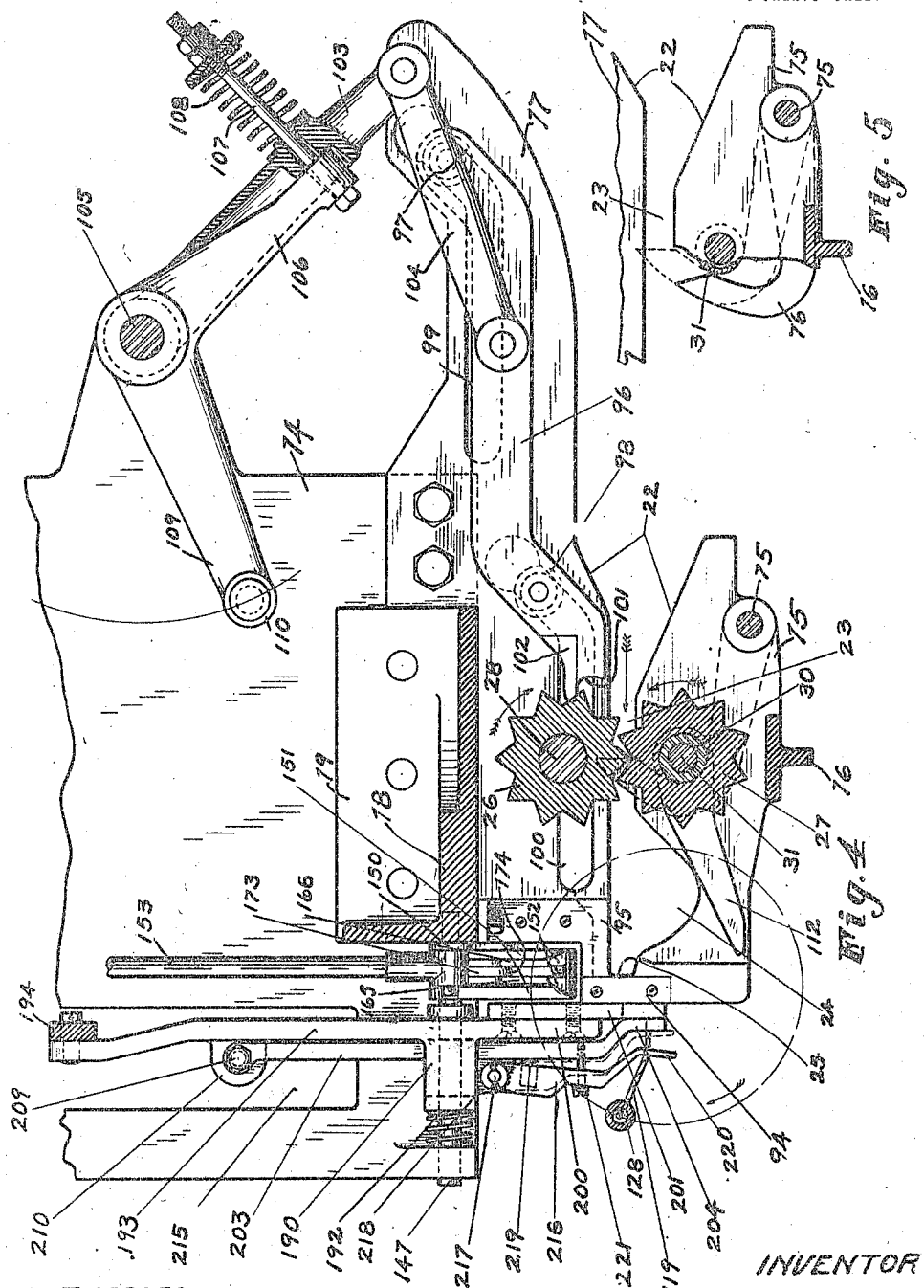

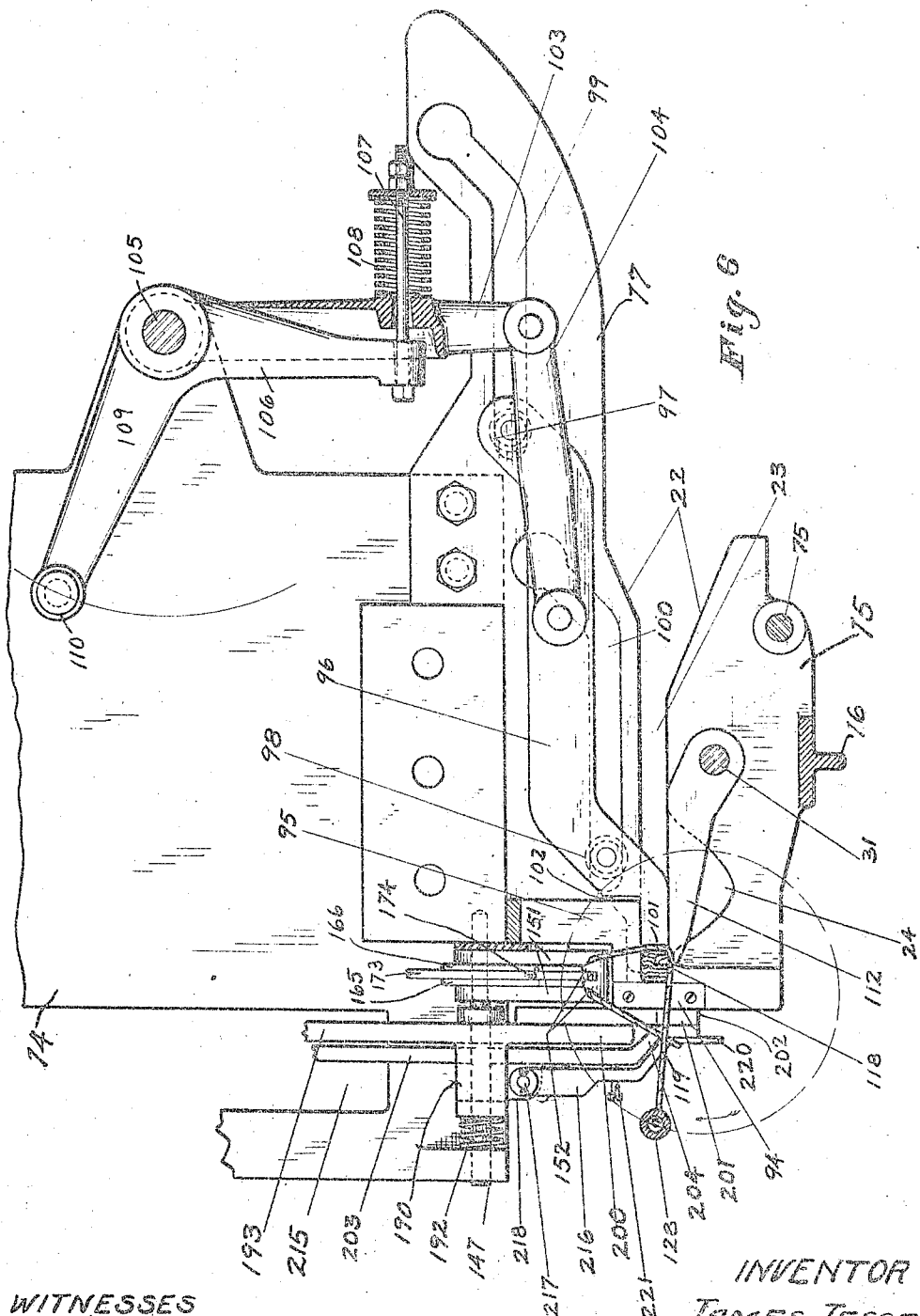

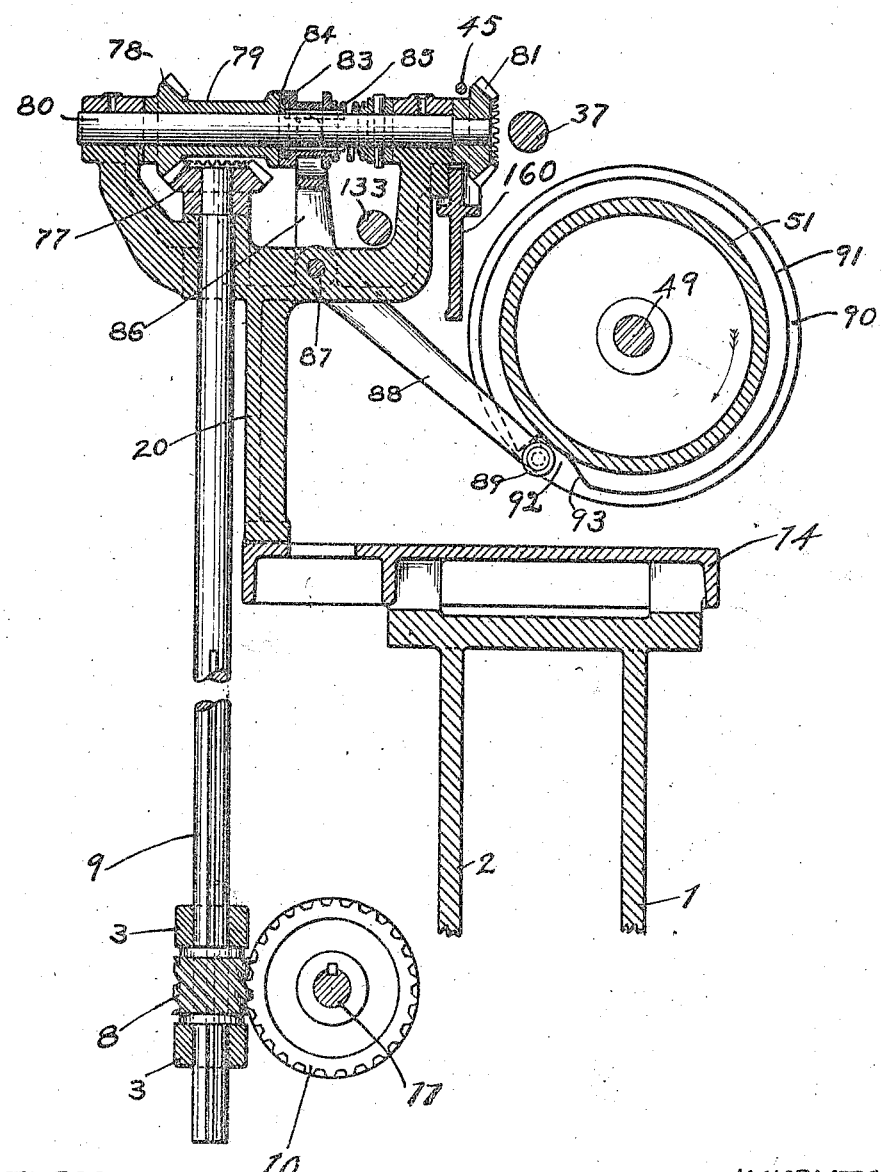

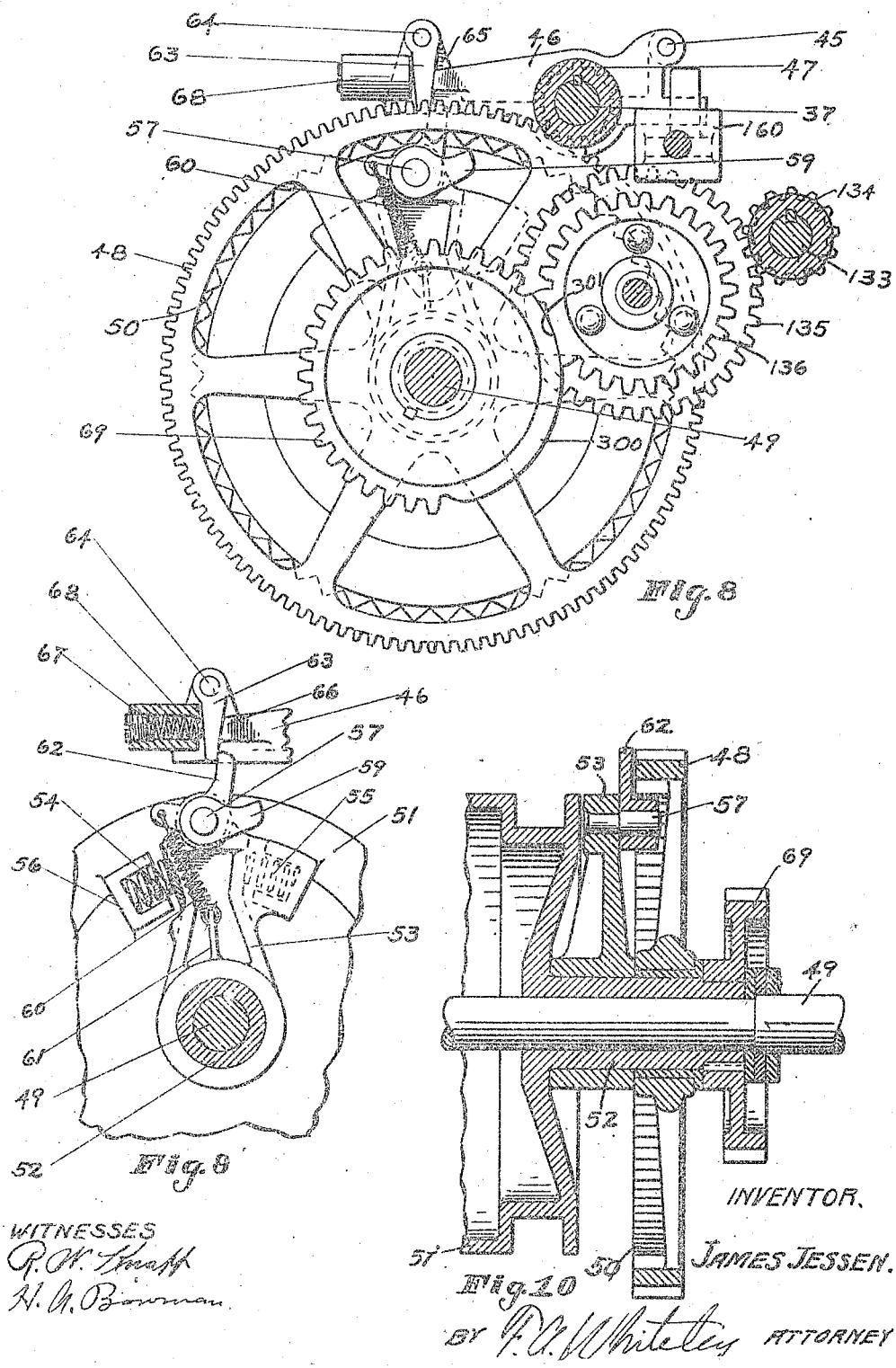

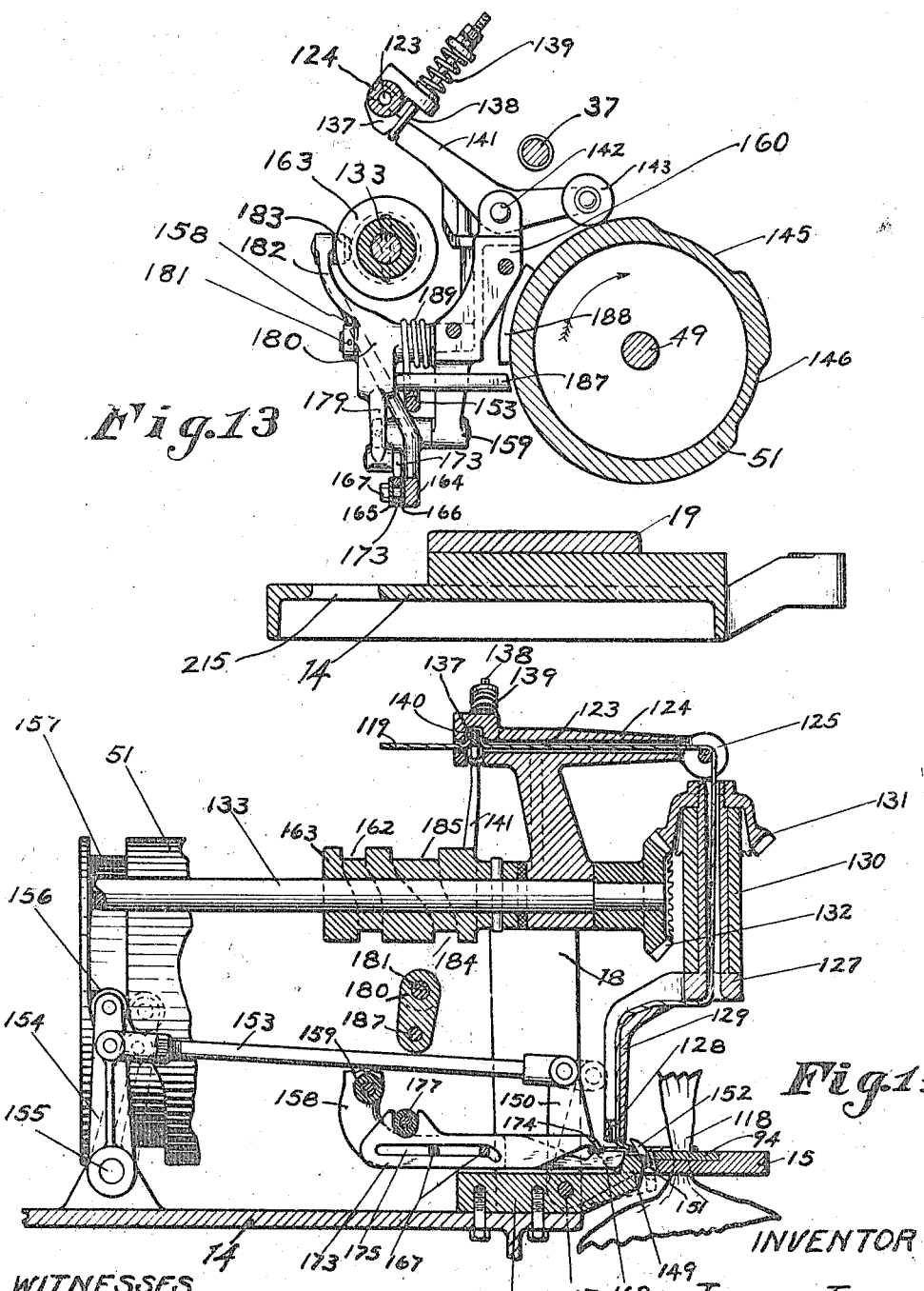

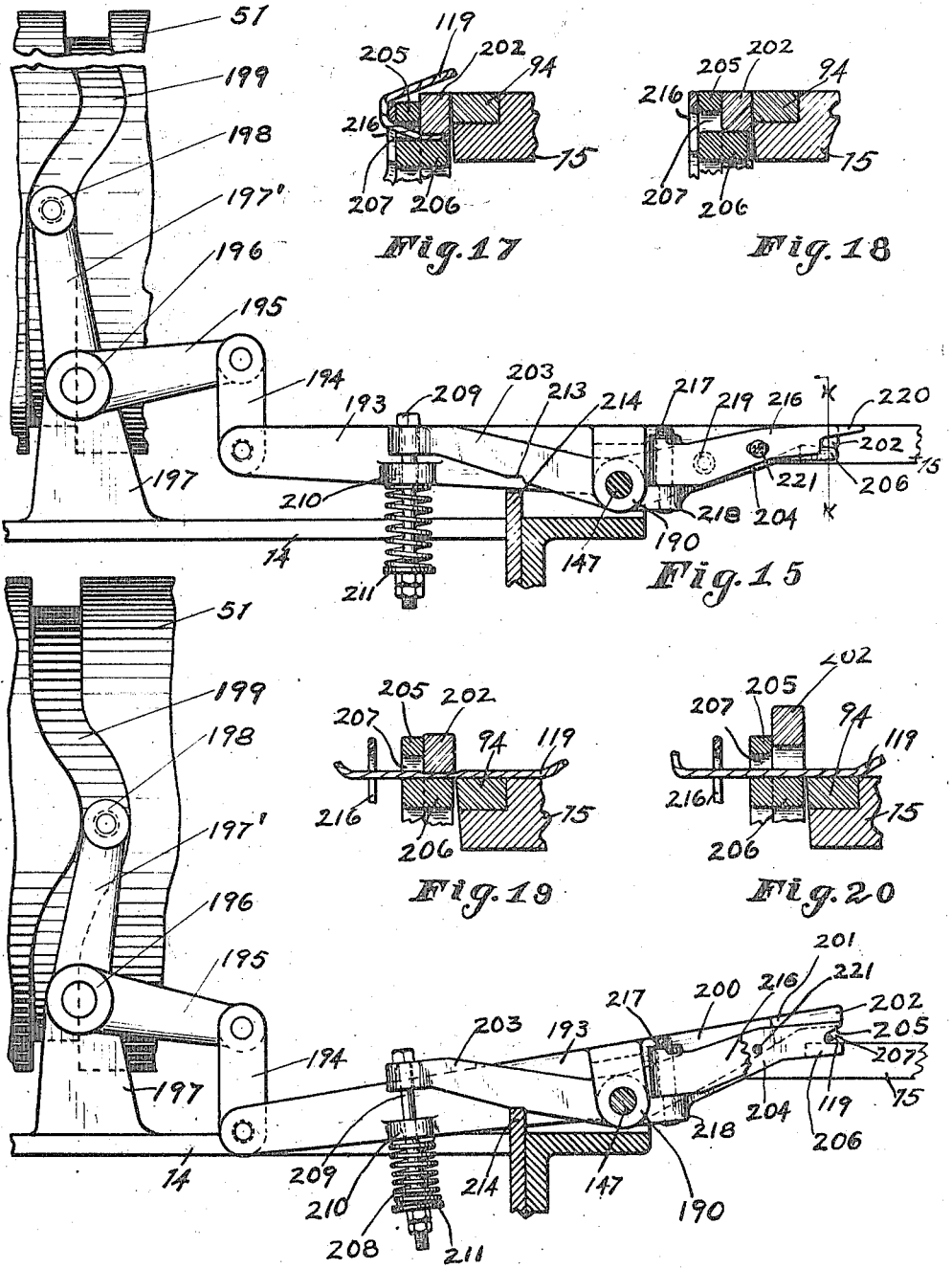

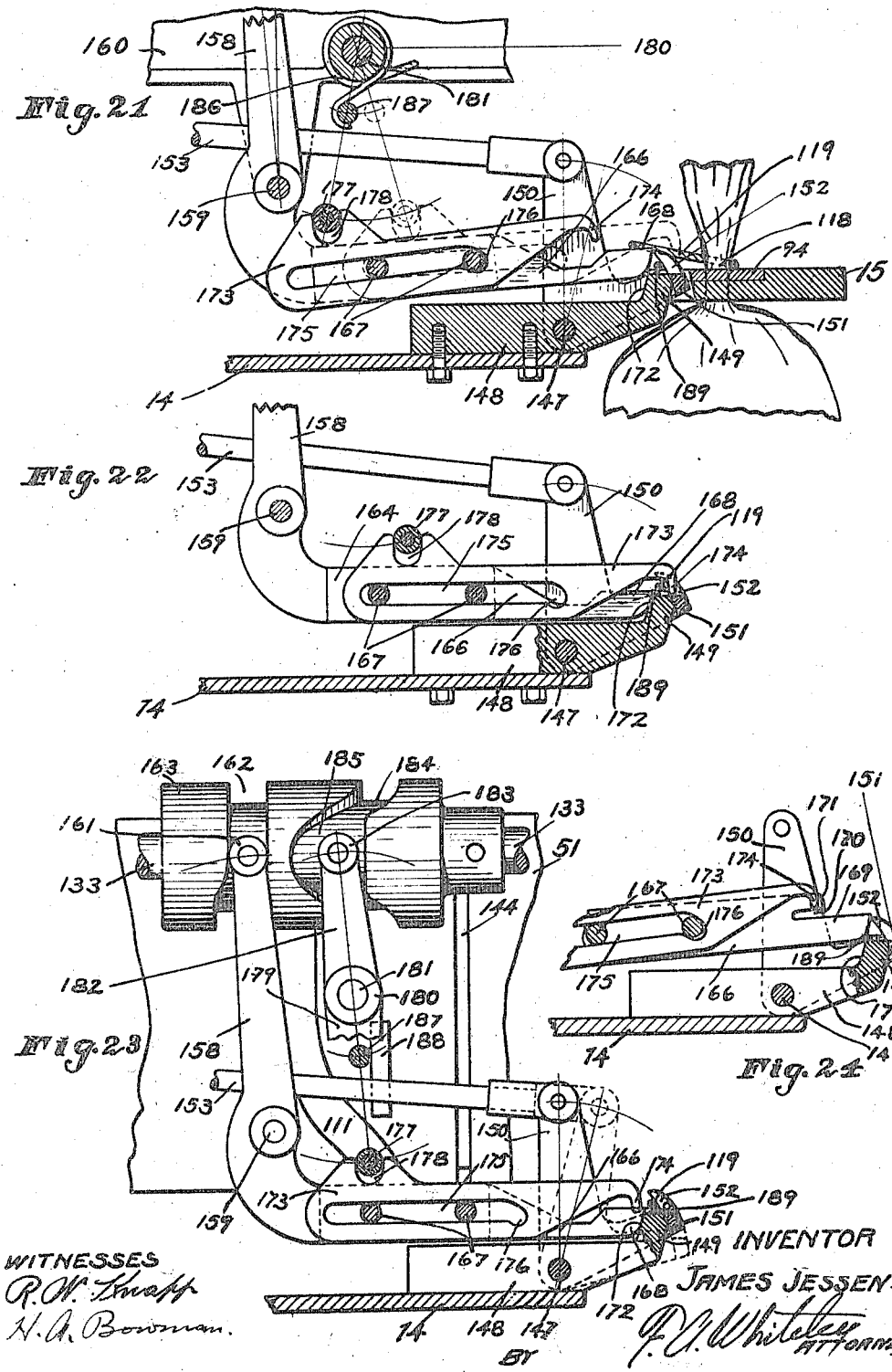

J. JESSEN.
BAG CLOSING AND TYING MACHINE.
APPLICATION FILED APR. 13, 1915.

1,196,459.

Patented Aug. 29, 1916.
13 SHEETS—SHEET 12.

WITNESSES
R. W. Knapp
H. A. Bowman

INVENTOR
JAMES JESSEN
by P. A. Whiteley ATTORNEY

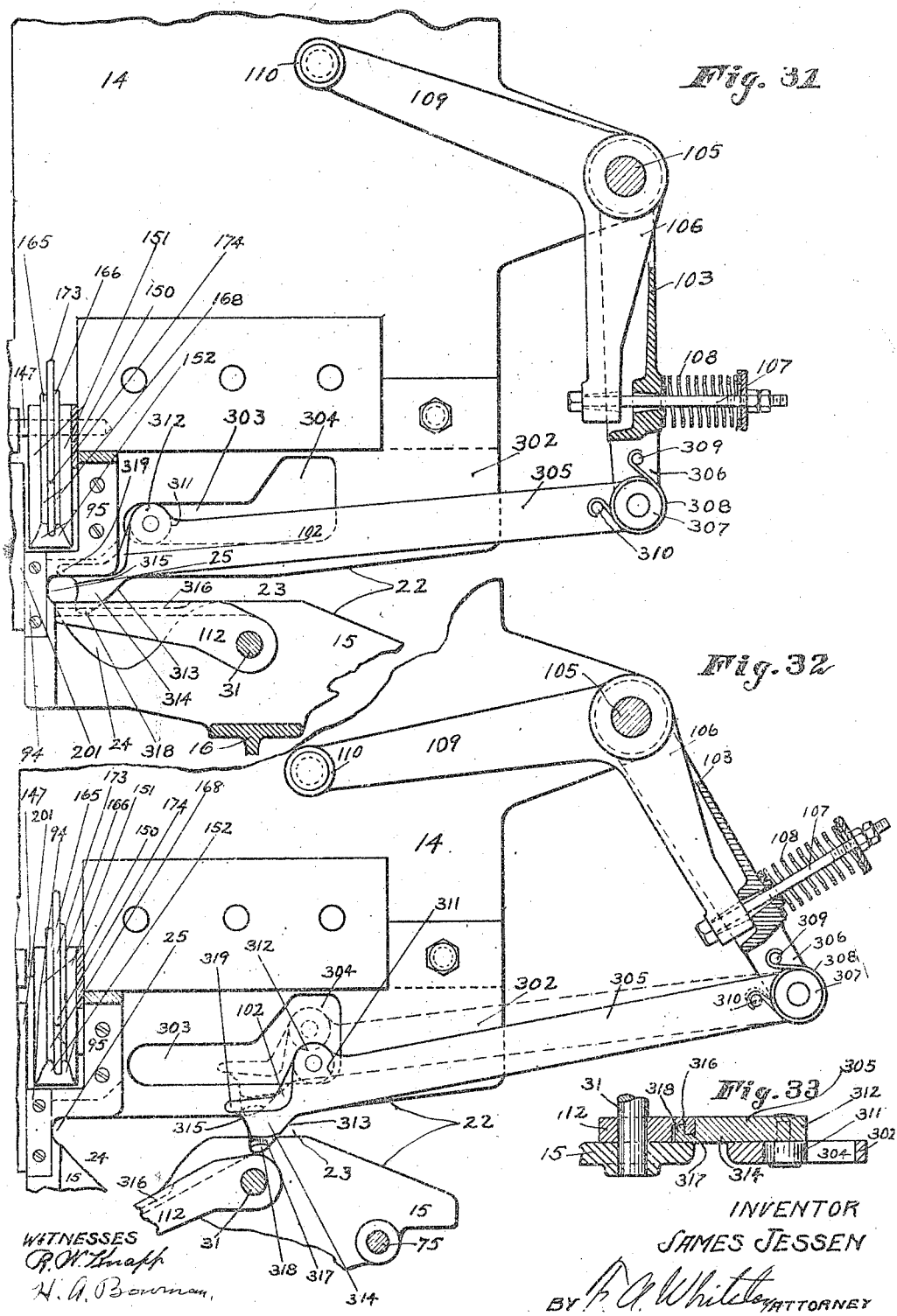

UNITED STATES PATENT OFFICE.

JAMES JESSEN, OF MINNEAPOLIS, MINNESOTA, ASSIGNOR TO HENRY O'B. HARDING, OF MINNEAPOLIS, MINNESOTA.

BAG CLOSING AND TYING MACHINE.

1,196,459.

Specification of Letters Patent.  Patented Aug. 29, 1916.

Application filed April 13, 1915.  Serial No. 21,020.

*To all whom it may concern:*

Be it known that I, JAMES JESSEN, a citizen of the United States, residing at Minneapolis, in the county of Hennepin and State of Minnesota, have invented certain new and useful Improvements in Bag Closing and Tying Machines, of which the following is a specification.

My invention relates to bag closing and tying machines and has for its object to provide machines which will close and compact the mouth of the sack, lay loops of cord about the mouth of the sack, form said cords into a knot and tighten the same by the action of the cord-laying member, together with means for gripping and severing the cord as the same is being moved in its final laying operation. The invention also includes means for tensioning and holding the cord to permit the cord-laying member to take up slack and tighten the knot.

The full objects and advantages of my invention will appear in connection with the detailed description thereof and are particularly pointed out in the claims.

Figure 1:
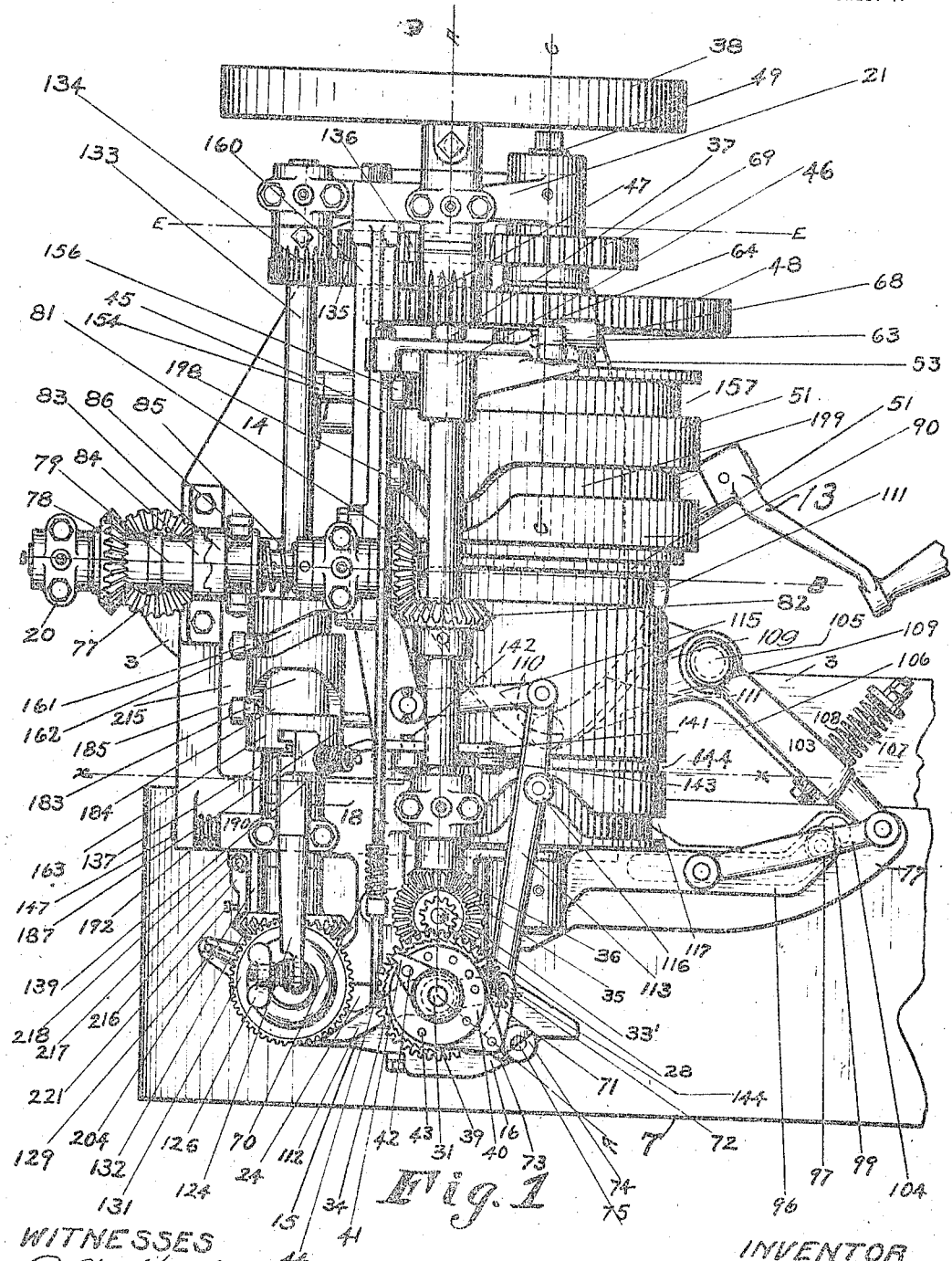
Figure 2:
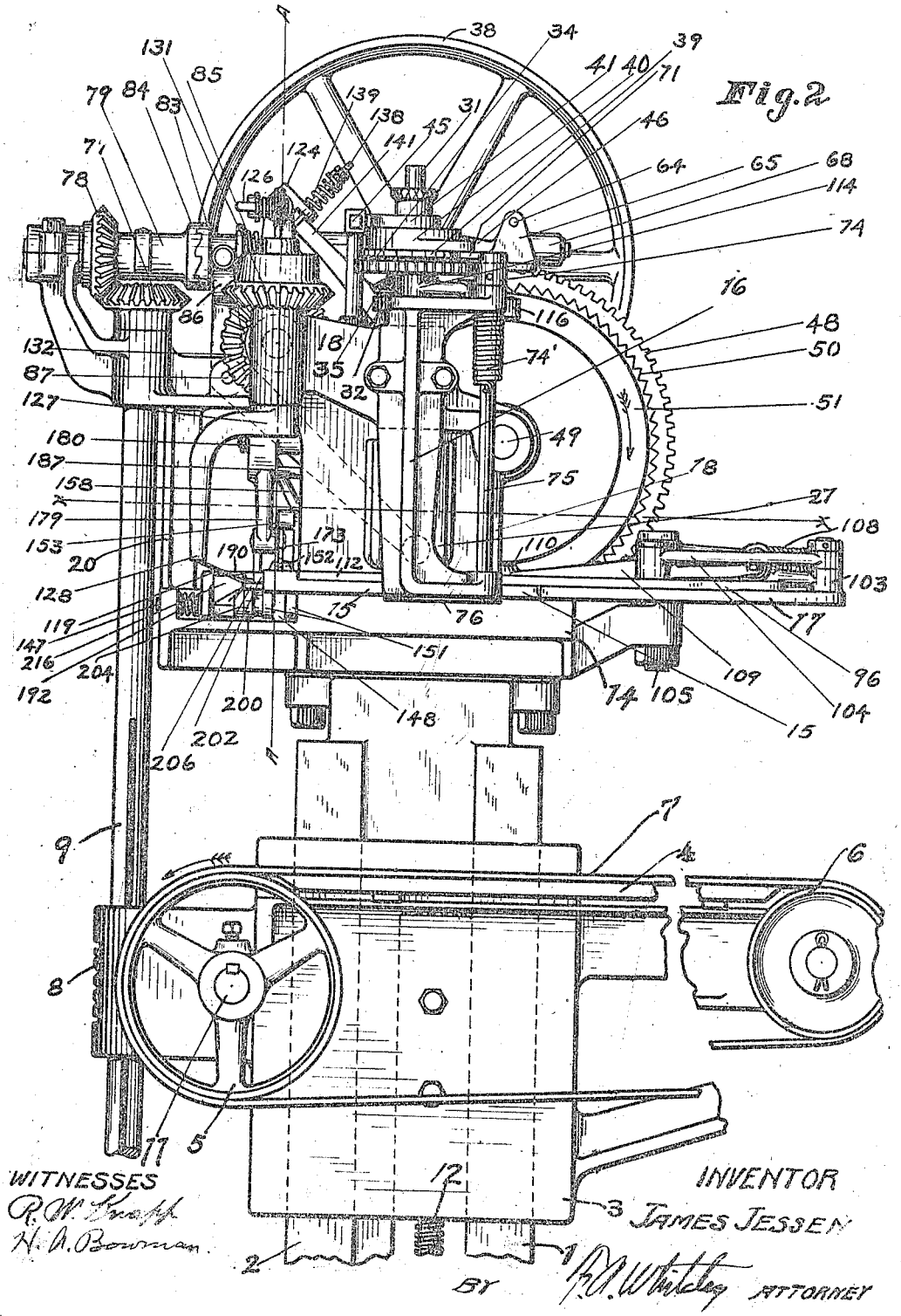
Figure 11:
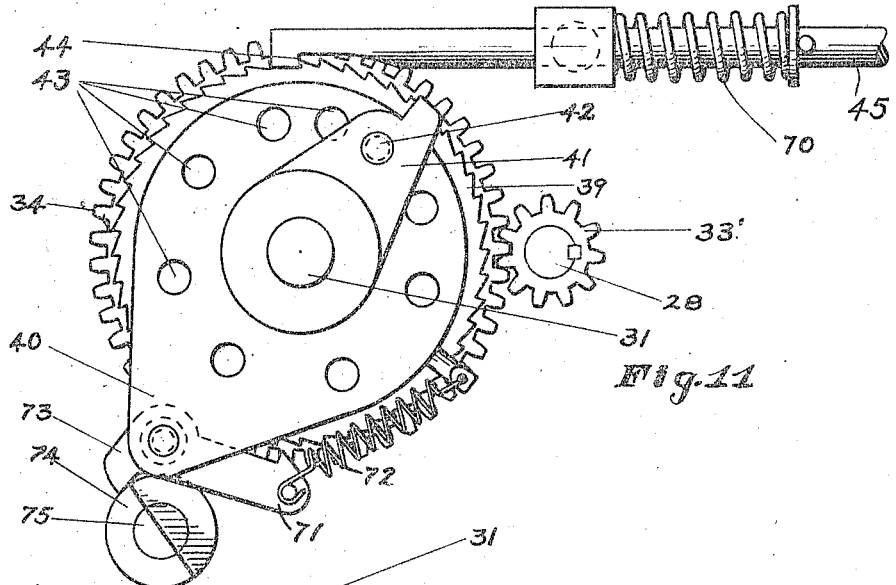
Figure 12:
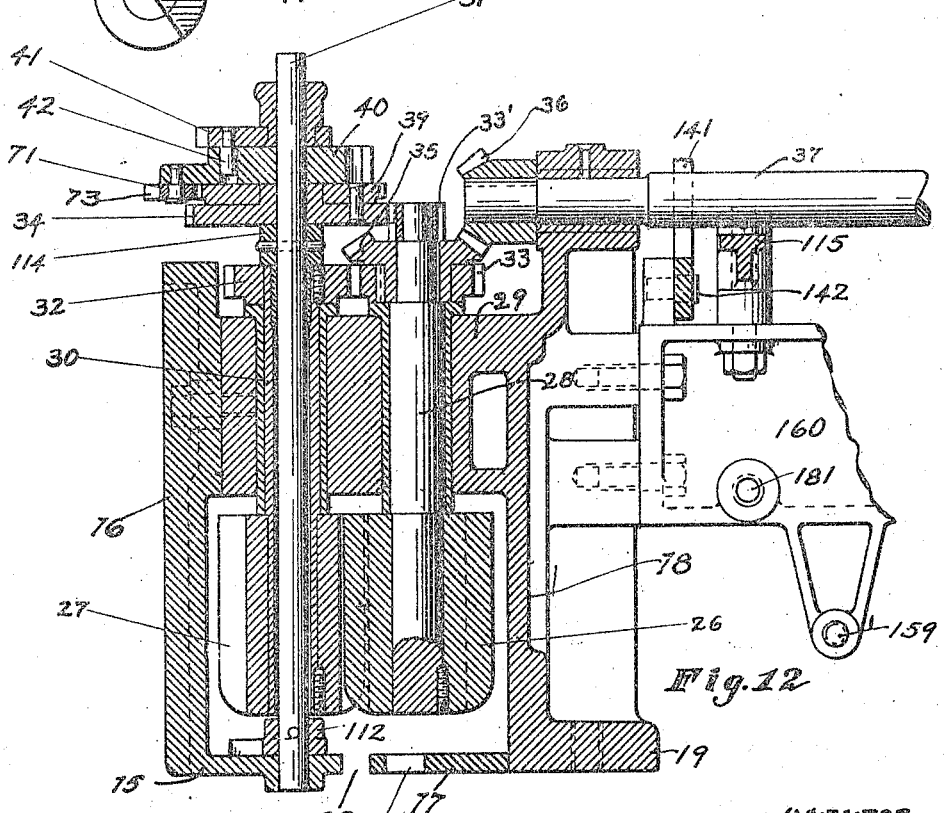
Figure 25:
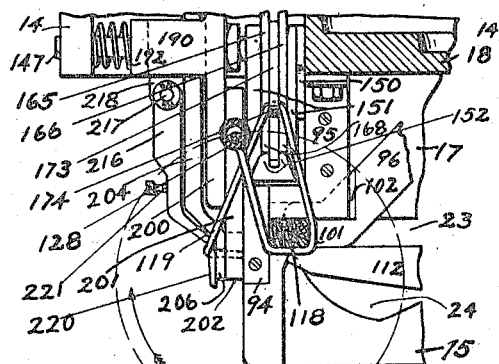
Figure 26:
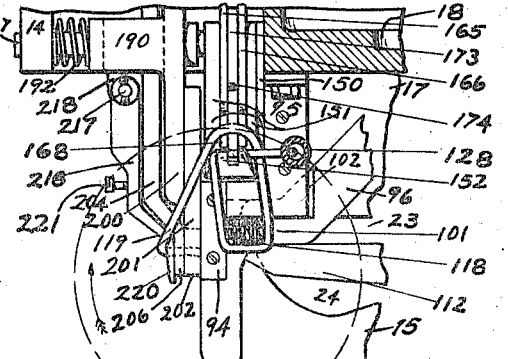

In the drawings, illustrating the application of my invention in one form, Figure 1 is a top plan view of a machine embodying the invention. Fig. 2 is a front elevation with the lower portion of the machine broken away. Fig. 3 is a side elevation viewed from the back. Fig. 4 is a sectional plan view on line *x—x* of Fig. 2. Fig. 5 is a sectional detail of some parts partially shown in Fig 4. Fig. 6 is a sectional plan view of the machine taken on the feeding plane of the sack mouths. Fig. 7 is a sectional elevation on line B—B of Fig. 1. Fig. 8 is a sectional view on line E—E of Fig. 1. Fig. 9 is an exposed detail view of some of the parts shown in Fig. 8. Fig. 10 is a sectional view on line C—C of Fig. 1. Fig. 11 is a detail view of the trip for the starter mechanism. Fig. 12 is a sectional view on line A—A of Fig. 1. Fig. 13 is a sectional view on line *x—x* of Fig. 1. Fig. 14 is a sectional view on line A—A of Fig. 2. Figs. 15 and 16 are detail views of the cord-gripping and cutting mechanism. Figs. 17, 18, 19 and 20 are sectional views on an enlarged scale of line *x—x* of Fig. 15 showing the parts in different positions.

Figs. 21, 22, 23 and 24 are sectional views showing the construction and various operative positions of the cord loop-controlling mechanism. Figs. 25, 26, 27, 28, 29 and 30 are diagrammatic part sectional views showing the cord-laying mechanism in different positions. Figs. 31 and 32 are plan views of a preferred form of sack-compacting pusher mechanism. Fig. 33 is a sectional view across the pusher toe and coöperating finger.

The machine is supported upon standards 1 and 2 on a base not shown. Upon these standards is located a slide 3 having thereon a platform 4 and pulleys 5 and 6 over which runs an endless belt 7, the pulley 5 being driven by a worm 8 splined on a vertical shaft 9 which is driven as will be hereinafter pointed out. The worm 8 meshes with a worm wheel 10 on the shaft 11 of pulley 5. The belt 7 upon platform 4 comprises a feeding means for carrying the sacks through the tying mechanism and is adapted to be raised and lowered for use with sacks of different sizes by means of an endless screw 12 threaded into the slide 3 operated by a hand crank 13.

Upon the top of standards 1 and 2 is formed a table 14. Supported upon the table 14 are various brackets and supporting members for holding the sack-tying organization and the operating means therefor. These comprise a plate 15 having secured thereto a standard 16, an extended plate 17, a standard 18 having a rectangular base 19 by which said standard is bolted to the table 14, a standard 20 for supporting certain gear-driving mechanism and a standard 21 which with standard 18 provides the main support for the cam members and principal driving elements of the tying mechanism. Plates 15 and 17 are in a common plane and provide between the same a passageway having an expanded bevel-sided mouth 22, a contracted throat 23, an enlarged portion 24 and a restricted end chamber 25, all as best shown in Figs. 4 and 6. The sacks upon the moving platform 7 have the upper portions thereof fed into the beveled opening 22 and restricted portion 23 of this passageway, when they are engaged by crimping rollers 26 and 27. Roller 26 is on a vertical shaft 28 hung and journaled in an extension 29 of the standard 18, and roller 27 is on a sleeve 30 similarly journaled on extension 29, said sleeve surrounding a shaft 31 which extends loosely through said sleeve and is journaled at its lower end in plate 15. Sleeve 30 has thereon a spur gear 32 which meshes with a spur gear 33 on shaft 28. Shaft 28 is provided with a pinion 33' which meshes with a spur gear 34 journaled upon shaft 31. Shaft 28 is also provided with a bevel gear 35 meshing with a bevel pinion 36 on a shaft 37 journaled in bearings on the standards 18 and 21, which shaft is provided with a pulley 38 operated by any source of power.

From the above it will be seen that the crimping rollers 26 and 27 are constantly driven when the machine is in operation and also that the gear 34 is constantly driven. The mechanism for laying the cord about the compacted mouth of the sack is set in operation from the constantly driven gear 34 by organizations shown in detail in Fig. 11. A ratchet wheel 39 is secured to gear 34. Loose on the shaft 31 is a plate 40 to which a dog 41 is secured in adjustable position by means of a pin 42 extending through apertures 43 in the plate 40. When the dog 41 is caused to revolve with gear 34 it will engage the notched end 44 of a slide rod 45 to the other end of which is secured a trip piece 46 slidably mounted on the shaft 37. The shaft 37 has thereon a pinion 47 which meshes with a spur gear 48 mounted on the shaft 49. Loose on the cam shaft 49 on the inner rim of spur gear 48 is a ratchet 50. The main cam drum 51 has a hub sleeve 52 extended through the gear 48. Mounted on said sleeve 52 is an arm 53, shown in detail in Figs. 9 and 10, which arm is yieldingly held to move with drum 51 by means of springs 54, 55 on each side of the arm seated in lug pockets 56 secured to the end of drum 51. Upon a pin 57 on arm 53 is journaled a dog 59 normally actuated by a spring 60 to bring the dog 59 into engagement with the ratchet 50, said spring being connected with the dog and with the eye piece 61 on the arm 53. Fast with the dog 59 is a finger 62 which is adapted to engage a finger 63 pivoted at 64 to an extension 65 of the piece 46 and yieldingly held in engagement with a lip 66 on the piece 46 by a spring 67 held in a socket 68 attached to piece 46. From the above it will be seen that when the rod 45 is slid by the dog 41 it carries with it the piece 46 and withdraws the finger 63 from engagement with finger 62, which permits spring 60 to throw the dog 59 into engagement with ratchet 50. This, through the yielding connection of arm 53 with drum 51, causes rotation of the cam drum and also of a gear 69 fast on the cam sleeve 52. When, however, the cam has completed one revolution the finger 62 will engage finger 63, which by operation of spring 70 on slide rod 45 has been restored together with piece 46 to its initial position immediately upon the release of said rod when the dog 41 has passed out of the notch 44. This engagement of finger 62 with finger 63 withdraws the dog 59 from the ratchet 50 and terminates an operation of the cam shaft. The dog 41 is caused to rotate with gear 34 through the feed of the sacks into the machine by another dog 71 pivoted to plate 40 and having connected therewith a spring 72 tending to pull the dog 71 into engagement with ratchet 39. A projection 73 on dog 71 is normally held by a cam 74 on the end of a vertical shaft 75 which has rigidly secured thereto a curved finger 76 normally positioned so as to extend across the contracted throat 23 through which the sack mouths are driven by the crimping rollers 26, 27. When the sack is finally forced through the throat the displacement of finger 76 rocks shaft 75 sufficiently to move the cam 74 so as to release dog 71 and connect plate 40 to rotate with gear 34. This will be through one complete revolution, cam 74 having been restored to initial position by torsion spring 74' and effecting disconnection of dog 71 when one revolution has been completed. Owing to different sizes of sacks fed through the machine it is desirable to position the dog 41 so as to operate at different times relative to the feed of the sacks, and this is accomplished by adjusting the dog 41 upon plate 40 through the pin 42 in the different apertures 43 provided in plate 40. The operation of the cam drum 51 and other parts and elements driven thereby is thus timed so as to permit all parts of the sack to pass through the crimping rollers before the beginning of the cam movement, which sets in operation the compacting and tying operations.

The shaft 9 for operating the feed belt 7 has thereon a bevel gear 77 meshing with a bevel gear 78 on a sleeve 79 which is loose on a shaft 80 journaled in bearings formed on arms of standard 20. The shaft 80 is constantly driven by means of a bevel gear 81 thereon which meshes with a bevel gear 82 on the shaft 37. Splined to shaft 80 is a clutch 83 adapted to engage a clutch face 84 on sleeve 79, said clutch being normally pressed into engagement with the face by a spring 85. A clutch fork 86 engages the clutch 83 and is pivoted at 87 to a portion of the standard 20, having an arm 88 with a roller 89 thereon which runs in a groove 90 in cam 51, and upon a cam portion 91 in said groove. Said cam portion has a depression 92 into which the roller 89 drops when the cam roller 51 is in its normal inoperative position. In this position, as shown in Fig. 7, the clutch 83 is in engagement with clutch face 84 so that shaft 9 and feed belt 7 are being driven. The first effect therefore of starting the operation of cam drum 51 is to cause roller 89 to rise from depression 92 on the bevel cam surface 93 of the cam portion 91, thereby throwing out clutch 83 and stopping the movement of feed apron 7. The next action of the cam roller will be to compact the crimped mouth of the sack and set the same in position for receiving the loops of thread for tying the same. As has heretofore been pointed out, the opening between plates 15 and 17 terminates in an end chamber 25 and this is surrounded by plates 94 and 95. A pusher 96 is mounted upon plate 17 and is guided for movement along the same by rollers 97 and 98 on the under side of said pusher 96, which rollers operate respectively in slots 99 and 100 in the plate 17, as most clearly shown in Figs. 4 and 6. The pusher 96 has an offset curved end 101 and a recessed shouldered portion 102 which is adapted to enter beneath plate 95, as clearly indicated in Fig. 6. The two slots 99 and 100 are parallel but separated from one another and formed with parallel branches extending at an angle to the main portions of said slots and having the continuing walls thereof connected by curves so that the first effect of movement of the slide will be to bring the curved end 101 over the throat 23 with the recessed finger portion 102 in alinement with one wall of said throat. The movement of the slide 96 is effected by an arm 103 connected by link 104 with the slide and pivoted to a pin 105 carried by the table 14. Upon the pin 105 is a two-armed lever, one arm 106 of which is connected by means of a bolt 107 extended through arm 103 and a compression spring 108 with said arm 103. The other arm 109 of the lever carries a cam roller 110 which operates in a cam-channeled groove 111 in the cam drum 51, as best seen in Fig. 1. This cam groove is so positioned that immediately upon the beginning of movement of the cam drum 51 the pusher 96 is forced from the position shown in Figs. 1 and 4 to the position shown in Fig. 6. In the meantime a finger 112 fast on the upright shaft 31 has been oscillated from the position in which it is shown in Fig. 4 to the position shown in Fig. 6 by a lever 113 pivotally connected with an arm 114 fast on shaft 31. Lever 113 is pivoted to an arm 115 which is pivoted to the frame member 160, and the lever 113 has a cam roller 116 operating in a cam groove 117 in cam drum 51. The cam groove 117 is so formed that at the beginning of rotation of cam 51 the finger 112 is brought into the closest position indicated in Fig. 6, being held there until the termination of the revolution of cam drum 51, when the finger is withdrawn permitting the tight neck of the sack to be withdrawn from the enlarged portion 24, the pusher 96 being simultaneously withdrawn from its holding position by reason of the formation of cam groove 111. By these means it will be seen that the neck of the sack is crimped and forced into a closely compacted neck portion, as indicated at 118, in which condition it is held during the looping and tying operations and from which it is released at the termination of these operations.

Figs. 31 and 32 illustrate the preferred form of pusher mechanism for compacting the neck of the sack. As here shown, a plate 302 is provided somewhat similar to plate 17 in its position and functions, excepting that it is of less extent and is provided with only a single slot 303. This slot is parallel with throat 23 and is provided with an enlarged portion 304 at the rear end thereof. A straight arm 305 is pivotally mounted directly to the end of arm 103, which may be flattened, as indicated at 306, better to receive the arm 305. A boss 307 on arm 305 receives a spring 308 which engages a lug 309 on arm 103 and a lug 310 on pusher arm 305, normally tending to hold said arm in its lowered position in which a roller 311 journaled in a projection 312 adjacent the end of said arm is held in engagement with the straight edge of slot 303 parallel with wall of throat 23. In this position the arm 305 is held so that the beveled rear edge 313 of a toe 314 on said arm extends across the throat 23 and a concaved front edge 315 of said toe is positioned to engage the sack and crimp the same when the pusher is actuated. The finger 112 is provided with a groove 316 and the toe 314 is provided with a channel 317 and lug 318 adapted to enter the groove 316 when the finger 112 is brought into closing position and the pusher 305 is actuated, as indicated in Fig. 3 and in dotted lines in Fig. 31. A tongue 319, similar to tongue 102 of pusher 96, is adapted to engage in the same way beneath plate 95. In operation this preferred form of pusher permits the sack to be fed past the toe 314 by reason of the yielding of spring 308, which lifts the roller 311 into the enlarged portion 304 of slot 303. After the crimped sack has been fed past the toe and the pusher 305 is actuated, the concaved face 315 of said pusher operates to force the same forward in a manner similar to face 101 of pusher 96.

As shown in Fig. 3, the cord 119 is laid from a ball or spool 120 mounted upon a spindle 121 secured to upright 2. From the spool the cord extends through an eye in a guide finger 122 and into a guide channel 123 formed in an extension 124 carried by standard 18, as best shown in Fig. 14. From the end of extension 124 the cord 119 passes between tension plates 125 controlled by a thumb screw 126 and through the center of a tubular sleeve 127 to the outlet 128 of the cord-laying finger 129 which is rigidly secured to sleeve 127, said sleeve being journaled in a bracket extension 130 secured to the frame piece 29. The sleeve 127 which carries the cord-laying finger has secured thereto a bevel gear 131 which meshes with a bevel gear 132 fast on a shaft 133 journaled in the standards 18 and 21. The shaft 133 has thereon a pinion 134 which meshes with an idler spur gear 135 driven through an idler 136 attached thereto by the spur gear 69 on the hub sleeve 52. The spur gear 69 is a mutilated gear with a toothless portion 300 which coöperates with a corresponding toothless portion 301 of gear 136. The parts are in the position shown in Fig. 8 when cam drum 51 is at rest and the toothless portion 300 on gear 69 permits the cam drum to be rotated sufficiently to actuate the neck-compacting mechanism before the beginning of the drive of gear 136. At the termination of the neck-compacting action the cord-laying finger 129 is put in operation and is carried through three complete revolutions while the cam drum 51 completes one revolution. As the cord 119 passes through the channel 123 it goes over a finger 137 which has an eye-bolt 138 actuated by a spring 139 so as to tend to force said finger into a socket 140 at one side of the channel 123 and clamp the cord 119. The finger 137 is on a lever 141 pivoted at 142 intermediate its ends and having a roller 143 engaging in a groove 144 in cam drum 51. The bottom of the groove 144 has two low places 145 and 146 and when the roller 143 comes above said low places the spring 139 will draw the finger 137 into the socket 140, thereby clamping the cord for a purpose which will later be pointed out.

In Figs. 6 and 25 to 30 is shown the circle which the cord-laying point 128 takes in reference to the compacted neck of the sack 118. It will be observed that this circle is eccentric to the center of the compacted neck, that is, the center of the circle is at one side of the center of the neck. By this means, in combination with the cord-gripping mechanism above described, the tightening of the knot and the loop is effected as will hereinafter be pointed out.

As the loops are laid about the neck 118 they are successively crossed so that when the series of crossed loops are drawn tight and hard they form what is known as the miller's knot. The means for crossing these loops will now be described. A shaft or pin 147 is rigidly secured parallel with the base plate 14 and extends through an anvil member 148 which is bolted to the base plate 14 and has an upturned end 149 which is substantially in the tying plane of plates 15 and 94. Pivotally mounted on the shaft 147 is an arm 150 having an extension 151 in the form of a yoke straddling the anvil piece 148 and its end 149, said extension being provided with a pair of hooks 152 spaced apart as clearly shown in Figs. 25 to 29, said hooks being above the cord-laying plane and being adapted to receive the loops of cord as they are laid by the cord layer 128. The arm 150 is connected by a link 153 with an arm 154 pivoted at 155 to a stand on the platform 14 and having a cam roller 156 running in a cam groove 157 in the cam drum 51. By this means the hooks 152 are at the proper time withdrawn below the plane of plates 15 and 94 for final releasing of the last loop, as will later be pointed out.

An arm 158 is pivotally connected intermediate its ends at 159 to a stand depending from a longitudinal frame member 160, the arm 158 having a cam roller 161 running in a cam groove 162 on a cam drum 163 fast on shaft 133. The arm 158 has a horizontally extended portion 164 to which are secured in spaced relation on one side thereof a pair of lifter plates 165, 166, said plates being held by bolts 167 and intervening collars, as best shown in Fig. 13. The lifter plates 165, 166 are provided with lifter ends 168 which may be an elevated platform-like construction, as indicated in Figs. 21, 22 and 23 or, as a preferred form, may have a straight extended portion 169 the surface of which runs back into a slot 170 beneath a stripper finger 171. The finger ends 169 or 168 are in one position adapted to register with the oblique inner wall 172 of the anvil projection 149. The other position of said lifter plates is brought about by the action of cam 163 causing said plates to be lifted as indicated in Figs. 21 and 24 above the horizontal plane passing through the ends of hooks 152. A finger 173 having on the end thereof a downwardly-turned hook 174 is provided with a longitudinal slot 175 by which the finger is slidably secured between plates 165, 166 upon the two bolts 167. The slot 175 has at its forward end a downwardly-turned portion 176. It will be apparent therefore that the finger 173 is adapted to slide in a straight line between plates 165 and 166 until one of the bolts 167 enters the depressed portion 176 of the slot 175, which will cause the forward end of the finger 173 and the hook 174 to rise to bring said hook above the lower edge of the finger 171, as clearly indicated in Fig. 24. Sliding movement in properly timed relation is given to finger 173 by a roller 177 engaging in a notch 178 formed on the upper part of finger 173. The roller is carried by an arm 179 fast on a hub 180 journaled on a pin 181 which is secured to frame member 160. Another arm 182 fast on hub 180 is provided with a cam roller 183 which runs in a cam groove 184 on the cam 163. The cam groove has a widened portion 185. A spring 186 on the hub 180 tends to turn the hub and the arm 182 so as to throw the finger 173 in its most forward position. A pin 187 is fast on a portion of arm 179 and extends in a position to come at one side of a fin 188 on the cam drum 51. The fin is so positioned relative to the cycle of operations that the pin 187 will come back of said fin so as to restrain movement of the cam roller 183 as the same passes through the widened portion 185 of the cam groove 184 at the time of the last revolution of the cam 163. This cam rotates coincidentally with the cord layer 129 and each rotates through three complete revolutions during one revolution of the cam drum 51. During the first two revolutions of the cord layer and cam 163 the sliding finger 173 is moved forward as indicated in dotted lines in Fig. 21 to come above the loop of cord laid in the hooks 152. The lifter and with it the hook 174 are then rocked to bring the hook 174 in the position shown in Fig. 22, after which the hook 174 is moved rearwardly along a groove 189 formed in the anvil end 149 carrying with it the loop of the cord 119 over the lifter plates 165, 166 to the position indicated in Fig. 14. Thereafter the lifter plates are rocked upwardly and the hook 174 is caused to rise to the relative positions shown in Figs. 21 and 24, in which the loop of cord 119 will slide from the lifter portions 168, 169 over hooks 152 so as to be crossed over the loop of cord 119, which has again been laid back of hooks 152. At the third revolution, however, owing to engagement of pin 187 by fin 188, which is placed on the cam drum 51 so as to come into the proper position at the third revolution of cam 163, the sliding finger 173 is prevented from moving forward above the loop of cord 119 (see Figs. 12 and 13) which remains in the hooks 152 until the final tightening of the formed knot has been effected and the cord running to the sack neck 118 has been severed, when the member 150 will be rocked by the operating parts connected therewith and move the hooks below the plane of the anvil extension 149, thus releasing the last loop with the sack. In the form of lifter members 168 with respect to hook 174 shown in Fig. 21 the lifter members are cut away below the hook so that when said hook rises ample space will be provided to permit the loop to fall away from the hook and be withdrawn over the lifter ends 168 and hooks 152. In the form shown in Fig. 24 the tongue 171 above slot 170 will positively strip the loop from the hook 174.

Figures 29, 30:
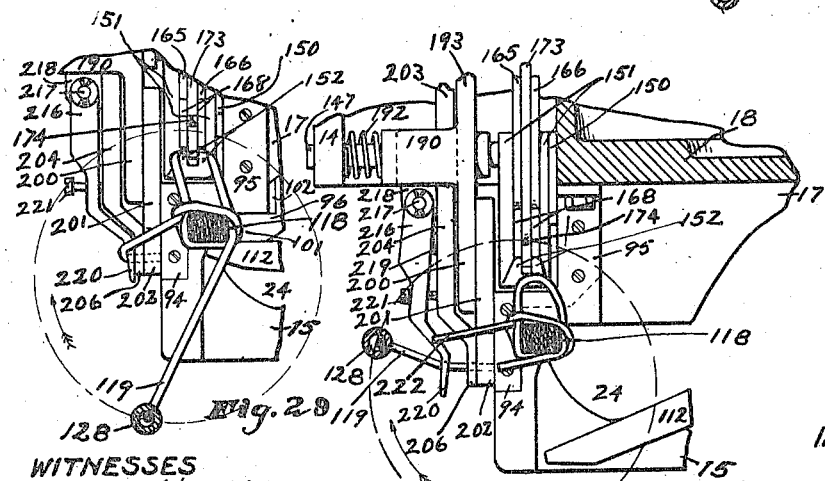

Means for holding the end of the thread and for cutting and regripping the same are provided adjacent the tying plate. The plate 94 heretofore referred to is a shearing plate. Pivoted to shaft 147 is a hub 190 which is loose on the shaft 147 and pressed along said shaft by a spring 192, as best shown in Figs. 4 and 6. The hub 190 is in the form of a yoke having two portions journaled upon shaft 147, one of said portions comprising a bar 193 which is pivotally connected to a link 194, said link being in turn connected to an arm 195 fast on a hub 196 journaled on a stand 197 extending from table 14. Fast with the hub 196 is an arm 197' having a cam roller 198 running in a cam groove 199 of the cam drum 51 as best shown in Figs. 15 and 16. Upon the forwardly extended portion 200 of bar 193 is rigidly secured a shear blade 201, said shear blade being formed with a protruding point 202, as best shown in Fig. 16. The side of shear blade 201 is pressed against the side of shearing plate 94 by the spring 192. Adjacent the bar 193 and pivoted to shaft 147 is an arm 203 which has an offset forwardly-projecting portion 204 with a beveled point 205 above a table-like extension 206, an intervening notch 207 being formed between the point 205 and the table 206. The table 206 is normally held firmly in contact with the under surface of the projecting point 202 of arm 201 by means of a strong spring 208 surrounding a bolt 209 secured to arm 203, said bolt extending through a lug 210 on arm 193 and the spring 208 acting between said lug and a washer or collar 211 on bolt 209. It will thus be seen that normally the bar 201 and arm 204 will move together when actuated from cam 51 through the connection with spring 208. The bar 203 is, however, provided with a notch 213 adapted to engage a fixed abutment 214 secured to the platform 14 adjacent a slot 215 formed in said platform which permits the passage of the bar 193 when the same is operated. Engagement of bar 203 with abutment 214 results in the oscillation of said bar relative to bar 193 and through compression of spring 208 this brings the pointed end 205 of bar 204 into lowered position relative to the extremity 202 of arm 201 with the result that the cord 119 extending between cord layer 128 and the compacted neck 118 is drawn into the notch at the end of arm 204 above the extension 206 and below the finger extremity 202. Immediately thereafter the cam drum 51 operates the mechanism for rocking bar 193 down to initial position, which has the result of first clamping the cord supply running to the cord layer between the finger 202 and the table 206, as shown in Fig. 19, thereafter severing the cord by the shears 94 and 202 as shown in Fig. 17. This results in freeing the cord which is secured to the compacted neck and has been knotted thereon and in gripping and holding the cord end running from the cord layer. The cam groove 199 is so formed as to produce this shearing and gripping action at substantially the termination of the third revolution of the cord layer. The lifting of bar 193 and depression of the holder plate 206 results in release of the cord end previously gripped, and to insure that such released end shall be immediately withdrawn from the holding means at the moment of release, there is provided an arm 216 pivotally secured at 217 to a lug 218 projected from the arm 203. The arm 216 is normally pressed outwardly by a spring 219 seated in a pocket in said arm 216 and engaging the side of the arm 203. A screw 221 which is fastened to arm 203 and extends loosely through an aperture in arm 216 limits the outward movement of said arm under influence of the spring. The arm 216 is provided with a finger 220 which is upwardly beveled and receives beneath the beveled portion and around the finger the held end of the cord 119 as clearly indicated in Figs. 25 to 29 inclusive, the first movement of the cord layer from initial position shown in Fig. 4 resulting in drawing the finger 220 into the position in which it engages the arm 204. Immediately upon cutting the cord the finger flies out as indicated in Fig. 30, the cut end 222 being pulled from beneath the clamping plate 206. To open the cord-holding jaws either for the purpose of removing the held end of the thread or inserting a new end to be held a hand lever 223 is pivoted at 224 to the frame and has a toe 225 adapted to engage the arm 203 and move the same against the force of spring 208 into open position. If at any time it is desirable to start the cord-laying apparatus without running the bag through the machine this may readily be done by drawing forward the rod 45 against the action of spring 70, thereby clutching the cam drum to the operating gear 48.

Figure 27:
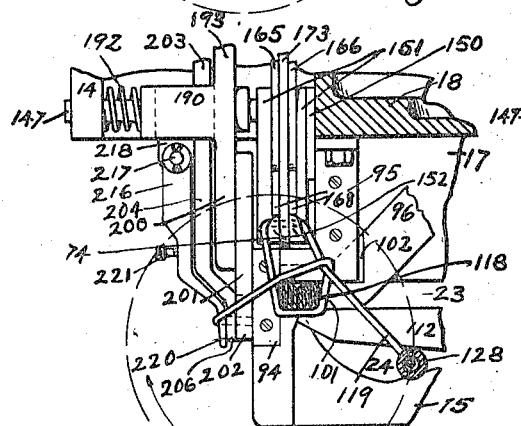
Figure 28:
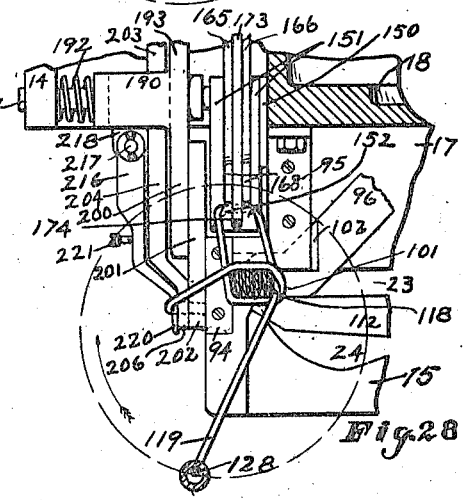

The operation of my device has been quite fully given in connection with the detailed description thereof. The means for feeding the sack and crimping the neck thereof and thereby connecting the cam and drum followed by the disconnection of the feeding means and the compacting and holding of the neck of the sack upon the tying plate have been very fully pointed out. The progressive operation of the cord-laying members to form the knot is illustrated very well in Figs. 4, 6 and 25 to 30 inclusive, the circles shown in dotted lines in these several figures representing the path of the delivery end 128 of the cord layer. As shown in Fig. 4, the parts are in initial position before a sack has been fed and before the cam drum 51 has been operated, the cord 119 running from the supply to the cord layer and from the end of the cord layer to the gripping mechanism. As illustrated in Fig. 6, the sack neck 118 has been compacted and is held projecting above the tying plate. The cord layer 128 has completed its first revolution, laying a loop of the cord over the hooks 152 and about the compacted neck 118, the tension on the cord resulting in the pulling of the finger 220 into its closed position. As the cord layer continues to move from the position shown in Fig. 6 to the position shown in Fig. 25 the hook 174 on slide bar 173 will have been brought from the dotted line position indicated in Fig. 21 down upon the loop in hooks 152 and have drawn back the loop from said hooks outside of the path of cord layer 128 so that as the same moves onward to the position indicated in Fig. 26 the second loop of cord can be laid in hooks 152. Immediately thereafter the hook 174 has been lifted and also the lifter bars 168, 169 so that the loop drawn back by hook 174 is now free to slide off of said lifter bars over the hooks 152, thus being crossed over the second loop being laid, as shown in Fig. 27. At this point the cord-gripping member 137 engages the cord as it comes from the supply 120 and as the cord layer passes from the position shown in Fig. 27 to that shown in Fig. 28. Owing to the eccentricity of the circular path of the cord layer relative to the center of the compacted neck, the cord will pull the loops already laid firmly upon the compacted neck, taking up any slack there may be. The operations are repeated during the third looping action of the cord layer, a second loop being crossed over the loops previously formed while the third loop is held in the hooks 152, as shown in Fig. 29. Here the cord layer in passing from the relative position shown in Fig. 27 to that of Fig. 29 has operated to pull the knot thus formed tight and hard. As the cord layer continues from the position shown in Fig. 29 to the initial position of Fig. 30, the cord holder and cutter is oscillated first to the position shown in Fig. 16, thus releasing the held end of the cord 222 and permitting finger 220 to pull the same out, and then the cord holder and cutter is returned to initial position, severing the cord and regripping the end running to the cord layer. At the same time the cam drum 51 has completed its revolution and the finger 62 engages finger 63, thus withdrawing dog 59 from ratchet 50 and terminating operation of the cord-laying and tying members, leaving the parts in the initial operative position as shown in Figs. 4 and 30. At the same time the finger 112 and the pusher 101 are retracted, the feeding operation of belt 7 recommences and the tied neck of the sack is readily withdrawn from the enlarged passageway 24, leaving everything in condition for repeating the operation.

The advantages of my invention will be apparent. The cord-laying member operating eccentrically with respect to the center of the compacted neck of the sack performs the double function of laying the loops of cord about the neck of the sack and of drawing said loops as the same are formed into the knot tight and hard. This is made possible by means for gripping and restraining the cord as the cord layer operates. The compacting mechanism operates with positiveness and certainty and always brings the compacted neck of the sack to the tying position at the proper moment to receive the first loop of cord from the cord layer. The various parts are operated effectively and simply from the two drive shafts and the two cam drums. The mechanism is compact, easily accessible, durable and effective. Moreover, the position of the cord-gripping and shearing device is such that the cord layer moves the cord directly into the gripper, and only a small change of position of the gripper, due to oscillation of the same, is required to effect opening for release of the held end of cord and reception of the cord from the cord layer and thereafter to sever and grip the new end thus formed.

I claim:

1. A tying machine comprising means for holding the object to be tied and knot-forming mechanism including a hook spaced from the object, means movable about said object and hook in a path which causes said means to approach and recede from the same for laying loops of cord about the object and in the hook, means for releasing the loops from the hook, and means for holding the cord so that the cord-laying means will take up the slack of said loops and draw the same tight and hard as it moves away from the object.

2. A tying machine comprising means for holding the object to be tied, a cord-laying finger movable about the object in a circle having its center entirely outside the object and adapted to lay loops of cord around said object, means for successively crossing said loops as laid to form a knot, and means for applying tension to the cord as the finger moves away from the object whereby said crossed loops are drawn tight and hard and formed into a knot.

3. A tying machine comprising means for holding the object to be tied and knot-forming mechanism including a hook spaced from the object, means movable about said object and hook in a path which causes said means to approach and recede from the same for laying loops of cord about the object and in the hook, means for successively releasing said loops from the hook and crossing the same as laid to form a knot, and means for holding the cord so that the cord-laying means will take up the slack of said loops as it moves away from the object and form said loops into a tight hard knot.

4. A machine for tying sacks comprising a plane-surfaced holding plate and means for compacting and holding the compacted neck of the sack with a portion extended above said plane surface, a cord supply, a cord-laying finger movable in a circle eccentric to the center of said compacted neck and adapted to lay the cord from said supply about said neck upon the surface, means for gripping and holding the cord between the supply and the finger as the finger moves away from the compacted neck to cause said finger to draw the cord tight about said neck, and means adapted to extend above said plane surface and movable relative thereto for successively crossing loops of the cord as they are laid to form a knot.

5. A machine for tying sacks comprising means for compacting and holding compacted the mouth of the sack so that a portion thereof extends outside of the compacting means, knot-forming mechanism including a hook spaced from said compacted mouth, a cord-laying finger mounted to move about said sack mouth and hook in a circle having its center entirely outside of said compacted mouth and at a point farther from the hook than from the compacted mouth, means for operating said knot-forming mechanism to successively release the loops from the hook and form the knot, and means for holding the cord as the finger moves away from the compacted mouth whereby said loops and knot are drawn tight and hard.

6. A machine for tying sacks comprising means for compacting and holding the compacted neck of the sack with a portion extended above said compacting means, a cord supply, a cord-laying finger movable about said compacted neck in a path such that the cord-delivery part of the finger is caused to approach and recede from said neck as it lays loops of cord from said supply about said neck, means at one side of the compacted neck for successively crossing the loops of the cord as they are laid to form a knot, and means for gripping and holding the cord between the supply and finger as the finger moves away from the compacted neck to cause the said finger to draw the loops and knot tight and hard.

7. A machine for tying sacks, comprising a plane-surfaced holding plate and means for compacting and holding the compacted neck of the sack with a portion extended above said plane surface, a cord-holder comprising two fingers spring held to grip the cord at the side of said plate and normally below the plane of said surface, a looping finger for laying loops of cord from said holder about the neck, and means to operate the holder to raise the same above the plane of said surface and separate the fingers so that the held end is released and the cord from the looping finger is laid between the members and gripped thereby.

8. A machine for tying sacks, comprising a plane-surfaced holding plate and means for compacting and holding the compacted neck of the sack with a portion extended above said plane surface, a cord-holder comprising two fingers spring held to grip the cord at the side of said plate and normally below the plane of said surface, a looping finger for laying loops of cord from said holder about the neck, means to operate the holder to raise the same above the plane of said surface and separate the fingers so that the held end is released and the cord from the looping finger is laid between the members, one of said members operating in conjunction with the plate as a shear, and means for restoring the cord-holder members whereby the cord from the finger is sheared and the cut end gripped and held.

9. A machine for tying sacks, comprising means for compacting the neck of the sack and for laying loops of cord about said neck and forming said loops into a knot, including a cord-holder comprising an arm, a finger on and movable with the arm having a portion spring held against the end of the arm to grip the cord, means for rocking the arm and finger, and means for holding said finger from movement while the same is being rocked to separate the arm and finger and permit the release of the held end of cord and the introduction of a fresh portion of the cord between said members.

10. A machine for tying sacks, comprising a sack-mouth receiving plate having a contracted passageway leading thereto, means for crimping and feeding the mouth of the sack through said contracted passageway, a pusher thereafter engageable with the crimped sack-mouth to compact the same against the tying plate, normally-inoperative means for actuating the pusher, and means controlled by movement of the crimped sack-mouth for rendering operative the pusher-actuating means.

11. A machine for tying sacks, comprising a sack-mouth receiving plate having a contracted passageway leading thereto, means for crimping and feeding the mouth of the sack through said contracted passageway, a pusher thereafter engageable with the crimped sack-mouth to compact the same against the tying plate, normally-inoperative means for actuating the pusher, means controlled by movement of the crimped sack-mouth for rendering operative the pusher-actuating means, and means for adjustably timing the operation of said sack-controlled means so as to vary the relative time of actuation of the pusher to permit sacks of different widths to be fed through the contracted passageway.

12. A machine for tying sacks, comprising a sack-mouth receiving plate having a contracted passageway leading thereto, means for crimping and feeding the mouth of the sack through said contracted passageway, a pusher thereafter engageable with the crimped sack-mouth to compact the same against the tying plate, normally-inoperative means to actuate the pusher, a clutch for rendering said means operative, a finger extending across said passageway and adapted to be engaged by the sack, and means controlled by movement of said finger for throwing in the clutch.

13. A machine for tying sacks, comprising a sack-mouth receiving plate having a contracted passageway leading thereto, a normally-running belt for feeding the sack so the sack-mouth will pass through said passageway, means for crimping the mouth of the sack as it is fed, normally-inoperative means for compacting the sack against the plate, means for terminating the feeding action of said belt, and means controlled by movement of the sack-mouth through the passageway for rendering said compacting-means operative and for operating said belt-drive terminating means.

14. A machine for tying sacks, comprising a sack-mouth receiving plate having a contracted passageway leading thereto, means for feeding the body of the sack so that the mouth thereof will pass along said passageway, means for crimping the mouth of the sack, means for compacting the crimped mouth against the plate with a portion extended above said plate, means controlled by the movement of the mouth of the sack through the passageway for terminating feed of the body of the sack, and means thereafter for laying a plurality of loops of cord about the compacted neck and forming the same into a knot.

15. A machine for tying sacks, comprising a sack-mouth receiving plate having a contracted passageway leading thereto, rollers for crimping and feeding the mouth of the sack through said contracted passageway, a pusher having a sack-engaging portion normally held so that the sack neck may pass the same, as it is fed through the crimping rollers, and means to operate the pusher so as to cause the engaging portion to engage the sack neck and compact the same at the tying plate.

16. A machine for tying sacks, comprising a sack-mouth receiving plate having a passageway therein, said passageway being formed with a contracted portion and with an extended portion, means for crimping and feeding the mouth of the sack through said contracted portion, a movable member adapted to be moved across the expanded portion so as to continue the contracted passageway to the tying point, a pusher engageable with the crimped sack-mouth to force the same along the extended contracted paassgeway, and means to operate said movable member and the pusher.

17. A machine for tying sacks, comprising a sack-mouth receiving plate having a passageway therein, said passageway being formed with a contracted portion and with an extended portion, means for crimping and feeding the mouth of the sack through said contracted portion, a movable member adapted to be moved across the expanded portion so as to continue the contracted passageway to the tying point, a pusher engageable with the crimped sack-mouth to force the same along the extended contracted passageway, means to operate said movable member and the pusher, means for laying and knotting a series of loops of cord about the compacted neck of the sack, and means operative thereafter to withdraw the pusher and the movable member to release the tied sack neck so the same may pass out of the expanded portion of the passageway.

18. A machine for tying sacks comprising means for compacting and holding the compacted neck of the sack with a portion extended above said compacted mouth, a cord supply, a cord-laying finger movable about said portion in a circle eccentric to the center thereof and adapted to lay loops of cord from said supply about said neck, means for gripping and holding the cord between the supply and finger as the finger moves away from the compacted neck to cause said finger to draw the cord tight about said neck, and means movable across the plane of the delivery end of the cord-laying finger for successively crossing the loops of the cord as they are laid to form a knot.

19. A machine for tying sacks comprising means for compacting and holding compacted the mouth of the sack so that a portion thereof extends outside of the compacting means, a cord supply, a holder for the end of the cord running from the supply and comprising two fingers, a looping finger for laying loops of cord from said holder about the neck, and means to raise the holder and separate the fingers so that the held end is released and the cord from the looping finger is laid between the holder fingers and gripped and severed thereby.

20. A machine for tying sacks comprising a fixed holder member, and means for compacting and holding the compacted neck of the sack against said member, a cord supply, a cord holder comprising relatively movable members normally held below the horizontal plane of the top of the holder member, spring means causing said cord holder members to grip the end of the cord from the supply, a looping finger through which the cord runs from the gripped end to the supply for laying loops of cord about said neck, and means to move the cord holder members relatively to bring one of the same above the plane of the holding member so that the held end is released and the cord from the looping finger is laid beneath said raised member and gripped thereby when the holder is restored to initial position.

21. A machine for tying sacks comprising a fixed holder member, and means for compacting and holding the compacted neck of the sack against said member, a cord supply, a cord holder comprising relatively movable members normally held below the horizontal plane of the top of the holder member, spring means causing said cord holder members to grip the end of the cord from the supply, a looping finger through which the cord runs from the gripped end to the supply for laying loops of cord about said neck, means to move the cord holder members relatively to bring one of the same above the plane of the holding member so that the held end is released and the cord from the looping finger is laid beneath said raised member and gripped thereby when the holder is restored to initial position, and means for bringing the relatively movable portions of the holder member together to grip the cord and for moving the holder member bodily to sever the cord between the gripped end and the neck of the sack.

22. A tying machine comprising a fixed member for holding the object to be tied, said holder member being formed at one side with a shear plate, a cord holder having a pair of relatively movable members, one of which is adapted to coöperate with said shear plate, a cord-laying finger, a cord supply from which the cord extends through said finger to the cord holder where the end of the cord is gripped and held, means for moving said cord-laying finger to lay the cord from said supply while the end is held in loops about said object, means for moving the cord holder and separating the relatively movable portions thereof to release the held end of the cord and admit the cord from the looper between said members, and means thereafter for closing said members and moving the cord holder to cause said coöperating shear members to cut the cord.

23. A machine for tying sacks comprising means for holding the compacted neck of the sack, a fixed shear blade on one side of said holding means, a cord holder movable past said shear blade and comprising two fingers spring held to grip the end of the cord and normally positioned below the plane of the holder member and shear blade, one of said members comprising a moving shear blade for coöperating with the fixed shear blade, a looping finger for laying loops of cord extending from said holder about the neck, means to operate the cord holder to raise the same above the plane of said blade and holder means and separate the fingers so that the held end is released and the cord from the looping finger is laid between the members and above the fixed shear blade, and means for restoring the cord holder members to initial position whereby the cord is sheared and the cut end gripped and held.

In testimony whereof I affix my signature in presence of two witnesses.

JAMES JESSEN.

Witnesses:
F. A. WHITELEY,
H. A. BOWMAN.